(12) United States Patent
Domon et al.

(10) Patent No.: US 11,345,412 B2
(45) Date of Patent: May 31, 2022

(54) VEHICLE BOTTOM STRUCTURE AND MANUFACTURING METHOD OF VEHICLE BOTTOM STRUCTURE

(71) Applicant: Toyota Jidosha Kabushiki Kaisha, Toyota (JP)

(72) Inventors: Yoshinori Domon, Toyota (JP); Akira Nishino, Toyota (JP); Hideki Kanki, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 106 days.

(21) Appl. No.: 17/007,734

(22) Filed: Aug. 31, 2020

(65) Prior Publication Data
US 2021/0070374 A1    Mar. 11, 2021

(30) Foreign Application Priority Data
Sep. 6, 2019    (JP) .............................. JP2019-162872

(51) Int. Cl.
*B60J 7/00*    (2006.01)
*B62D 25/20*    (2006.01)
*B62D 25/24*    (2006.01)

(52) U.S. Cl.
CPC .............. *B62D 25/20* (2013.01); *B62D 25/24* (2013.01)

(58) Field of Classification Search
CPC ......... Y02E 60/10; A61P 35/00; A61K 38/00; B62D 55/0887; A61J 1/10
See application file for complete search history.

(56) References Cited

U.S. PATENT DOCUMENTS

| | | | |
|---|---|---|---|
| 3,321,235 A * | 5/1967 | Muller | B62D 21/02 296/204 |
| 6,007,145 A | 12/1999 | Tezuka | |
| 7,140,642 B2 * | 11/2006 | Ito | B60K 15/063 280/834 |
| 9,280,995 B2 * | 3/2016 | Fan | G11B 5/59661 |
| 2015/0145284 A1 * | 5/2015 | Nishida | B62D 25/2036 296/187.1 |
| 2017/0080978 A1 * | 3/2017 | Yoshida | B62D 25/2036 |
| 2020/0062318 A1 * | 2/2020 | Otoguro | B60K 1/04 |
| 2021/0070374 A1 * | 3/2021 | Domon | B62D 25/24 |

FOREIGN PATENT DOCUMENTS

JP    H11-291954 A    10/1999

* cited by examiner

*Primary Examiner* — Kiran B Patel
(74) *Attorney, Agent, or Firm* — Dinsmore & Shohl LLP

(57) ABSTRACT

In a vehicle bottom structure, a floor panel to which a cross member is fixed is connected to a rocker inner which is a skeleton member. The floor panel and the rocker inner are sealed from a lower side by a lower seal member, but a region near the reinforcement member is a lower non-sealed part which cannot be sealed. Further, the floor panel and the rocker inner are sealed from an upper side by an upper seal member, but a region near the cross member is an upper non-sealed part which cannot be sealed. On respective sides of the upper non-sealed part, connecting seal members are provided, so that the lower seal member and the upper seal member are connected and a waterproof line is formed.

4 Claims, 8 Drawing Sheets

VEHICLE BOTTOM STRUCTURE AND MANUFACTURING METHOD OF VEHICLE BOTTOM STRUCTURE

CROSS REFERENCE TO RELATED APPLICATION

This application claims priority to Japanese Patent Application No. 2019-162872 filed on Sep. 6, 2019, which is incorporated herein by reference in its entirety including the specification, claims, drawings, and abstract.

TECHNICAL FIELD

The present disclosure relates to a vehicle bottom structure related to sealing of a vehicle bottom, and to a manufacturing method thereof.

BACKGROUND

On a bottom of a vehicle, sealing is applied for preventing entry of water from outside of a vehicle cabin into an interior of the vehicle cabin.

JP H11-291954 A discloses a structure in which a tunnel member provided at a center in a vehicle width direction and floor panels (floor members) provided on left and right of the tunnel member are sealed. Specifically, flanges of the floor panels are overlapped with side walls of the tunnel member, and spot welding is performed. A gap between an upper end of the flange of the floor panel and the side wall of the tunnel member is sealed from an upper side, over a range spanning a front-and-rear direction of the vehicle. A cross member is provided at an upper side of the floor panel. However, because the upper end of the flange of the floor panel extends to a position higher than an upper end of a flange of the cross member, the cross member does not become an obstruction during the sealing.

In the structure of JP H11-291954 A, the sealing of the tunnel member and the floor panel must be performed at an upper side in relation to the upper end of the cross member, thereby requiring a sufficiently wide space at the upper part. However, when the cross member is connected to a skeleton member (for example, a rocker) at the vehicle side, in many cases, it may be difficult to secure a space in the up-and-down direction. Because of this, at portions where the cross member exists or the like, it becomes difficult to secure waterproofing with one seal from an upper side (that is, the vehicle cabin side) or from a lower side (that is, from outside of the vehicle).

An advantage of the present disclosure lies in provision of a new vehicle bottom structure for securing waterproof capability of the bottom of the vehicle in cases where there is a portion where sealing is difficult.

SUMMARY

According to one aspect of the present disclosure, there is provided a vehicle bottom structure comprising: a skeleton member provided at a bottom of a vehicle; a panel member having, at an end thereof, a flange which extends in an up-and-down direction, wherein the flange is connected to the skeleton member; a lower seal member that seals a lower side of the flange and the skeleton member from a lower side; and an upper seal member that seals an upper side of the flange and the skeleton member from an upper side, wherein, in regions near a lower non-sealed part in which the sealing by the lower seal member is not performed and near lower sealed parts at both sides of the lower non-sealed part, in which the sealing by the lower seal member is performed, the sealing from the upper side by the upper seal member is performed over a range opposing these regions with the flange therebetween, in regions near an upper non-sealed part in which the sealing by the upper seal member is not performed and near upper sealed parts at both sides of the upper non-sealed part, in which the sealing by the upper seal member is performed, the sealing from the lower side by the lower seal member is performed over a range opposing these regions with the flange therebetween, and, in a region between a location of the lower sealed part on the side of the lower non-sealed part and a location of the upper sealed part on the side of the upper non-sealed part, sealing by a connecting seal member, which connects the lower seal member and the upper seal member and seals the region, is performed.

According to another aspect of the present disclosure, in the vehicle bottom structure, the connecting seal member is foamable.

According to another aspect of the present disclosure, the vehicle bottom structure comprises a plurality of the lower non-sealed parts and a plurality of the upper non-sealed parts, and a waterproof line is passed between the lower seal member and the upper seal member via the connecting seal member, detouring around the plurality of the lower non-sealed parts and the plurality of the upper non-sealed parts.

According to another aspect of the present disclosure, there is provided a method of manufacturing the vehicle bottom structure, comprising: applying the connecting seal member which is foamable onto the skeleton member or the panel member; connecting the skeleton member and the panel member, and providing the lower seal member and the upper seal member.

According to another aspect of the present disclosure, the method further comprises foaming the connecting seal member.

According to various aspects of the present disclosure, because the lower seal member and the upper seal member are connected by the connecting seal member, there can be constructed a waterproof line which detours around the non-sealed part.

BRIEF DESCRIPTION OF DRAWINGS

Embodiment(s) of the present disclosure will be described based on the following figures, wherein.

DESCRIPTION OF EMBODIMENTS

An embodiment of the present disclosure will now be described with reference to the drawings. In the following description, in order to facilitate understanding, a specific configuration will be described. However, the configuration merely exemplifies the embodiment, and various other configurations are possible.

FIGS. 1A to 1F show a vehicle bottom structure 10 of a same part, shown in the order of manufacturing steps. An F axis in the coordinate system of these figures shows a vehicle front direction, a U axis shows an upward direction, and an R axis shows a right hand direction of an occupant (this applies similarly to the other drawings).

Figure 1A:
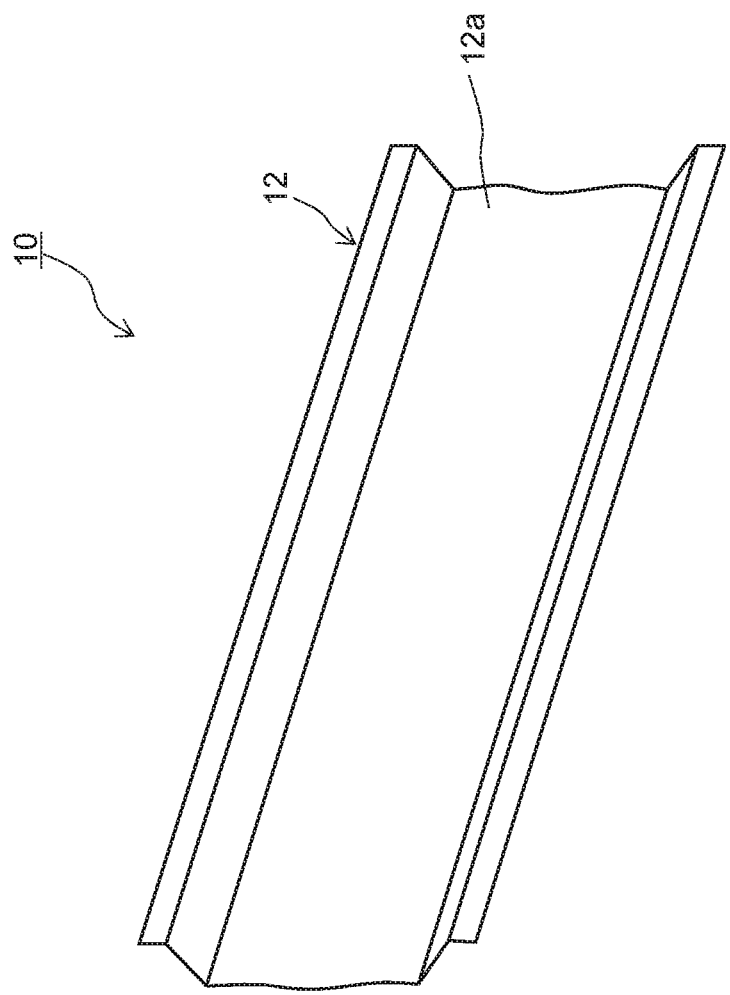
FIG. 1A is a diagram showing a rocker inner in a vehicle bottom structure.
Figure 1A:
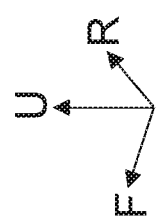

FIG. 1A is a diagram showing a portion, in a vehicle front-and-rear direction, of a rocker inner, of a rocker provided on a right side of the vehicle, placed at an inner side in a vehicle width direction. The rocker is a skeleton member which is provided to extend in the vehicle front-and-rear direction at each of respective sides below a floor of a vehicle cabin. The skeleton member is a member which has a strength to primarily carry out load transmission in the vehicle, and which forms a frame of a vehicle shape.

A front end of the rocker is welded to a lower end of a front pillar which is a skeleton member. In addition, the left and right rockers are connected to each other by a plurality of cross members 22 (which are skeleton members which extend in the vehicle width direction). At inner sides in the vehicle width direction of the left and right rockers, respectively, left and right side members, which are skeleton members which extend from a front end of the vehicle to a region near a rear end, are provided, and the rockers are connected also to the side members through the cross members 22.

The rocker is formed by combining and welding two or more steel plates which are bend-machined, in such a manner that left/right-up/down cross section (R-U cross section) is formed as a closed cross sectional shape in which an entire circumference is surrounded by various members. The rocker inner 12 shown in FIG. 1A is a steel plate which forms a side wall on the inner side in the vehicle width direction, and has a cross section of an approximate hat shape. A wall portion 12a corresponding to a hat top is formed in a flat shape spreading in the front/rear-up/down plane (F-U plane).

Figure 1B:
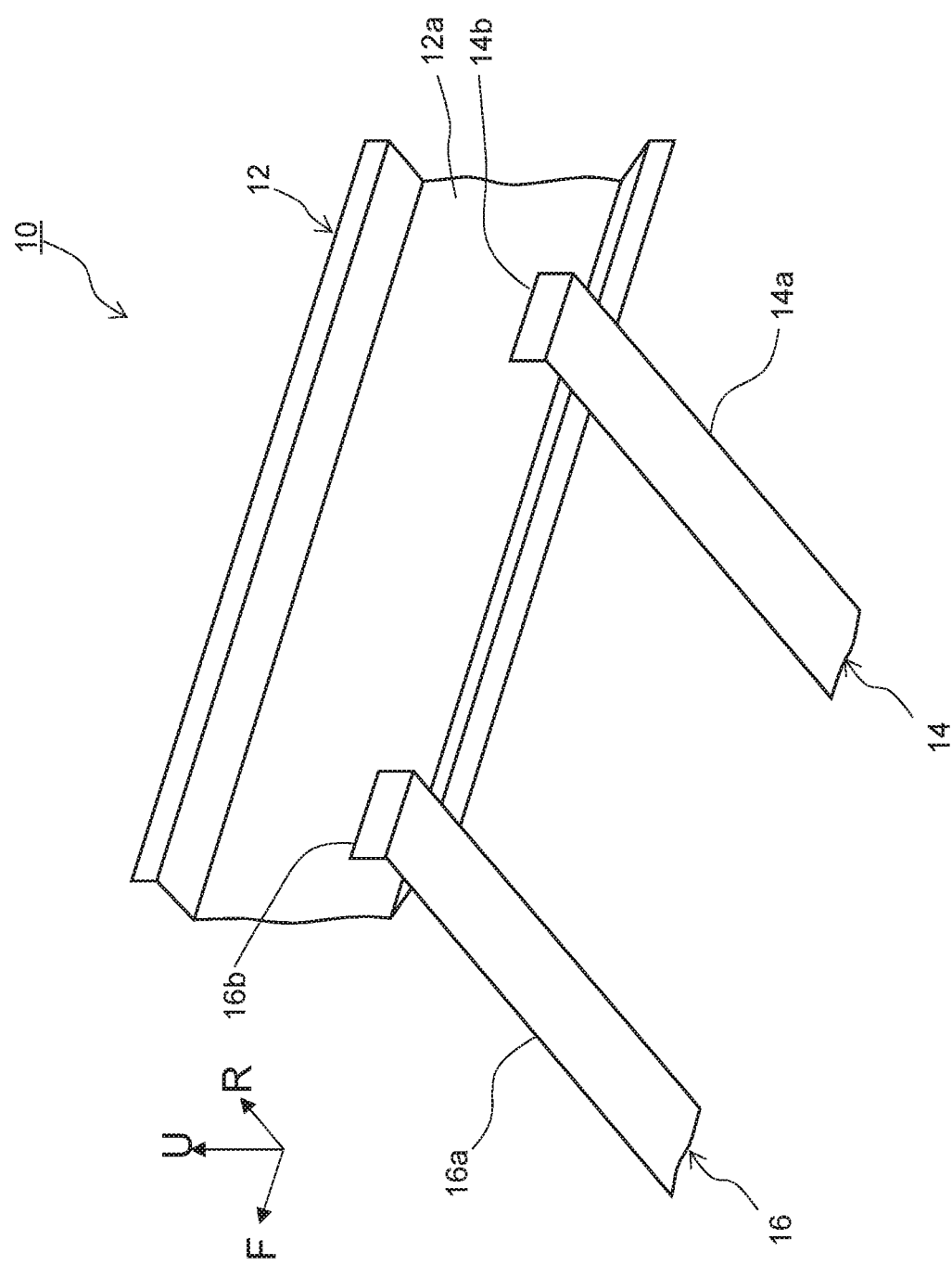
FIG. 1B is a diagram showing a step of attaching a reinforcement member to the rocker inner.

FIG. 1B shows the vehicle bottom structure 10 in a step following FIG. 1A. In this step, two reinforcement members 14 and 16 of the same shape are attached to the wall portion 12a of the rocker inner 12. The reinforcement members 14 and 16 are L-shaped members obtained by bend-machining an end of an elongated steel plate, and respectively include body portions 14a and 16a and flanges 14b and 16b formed by the bending. The flanges 14b and 16b are attached to the wall portion 12a of the rocker inner 12 by welding. The flange 14b and the flange 16b are attached at positions on the same horizontal level, separated in the front-and-rear direction. The body portions 14a and 16a extend toward the inner side in the vehicle width direction in an orientation in which the widest surfaces thereof are horizontal. In FIG. 1B, the inner sides in the vehicle width direction of the reinforcement members 14 and 16 are not shown. The reinforcement members 14 and 16 reinforce a floor panel 24 to be described later, and also reinforce other members which will not be described.

Figure 1C:
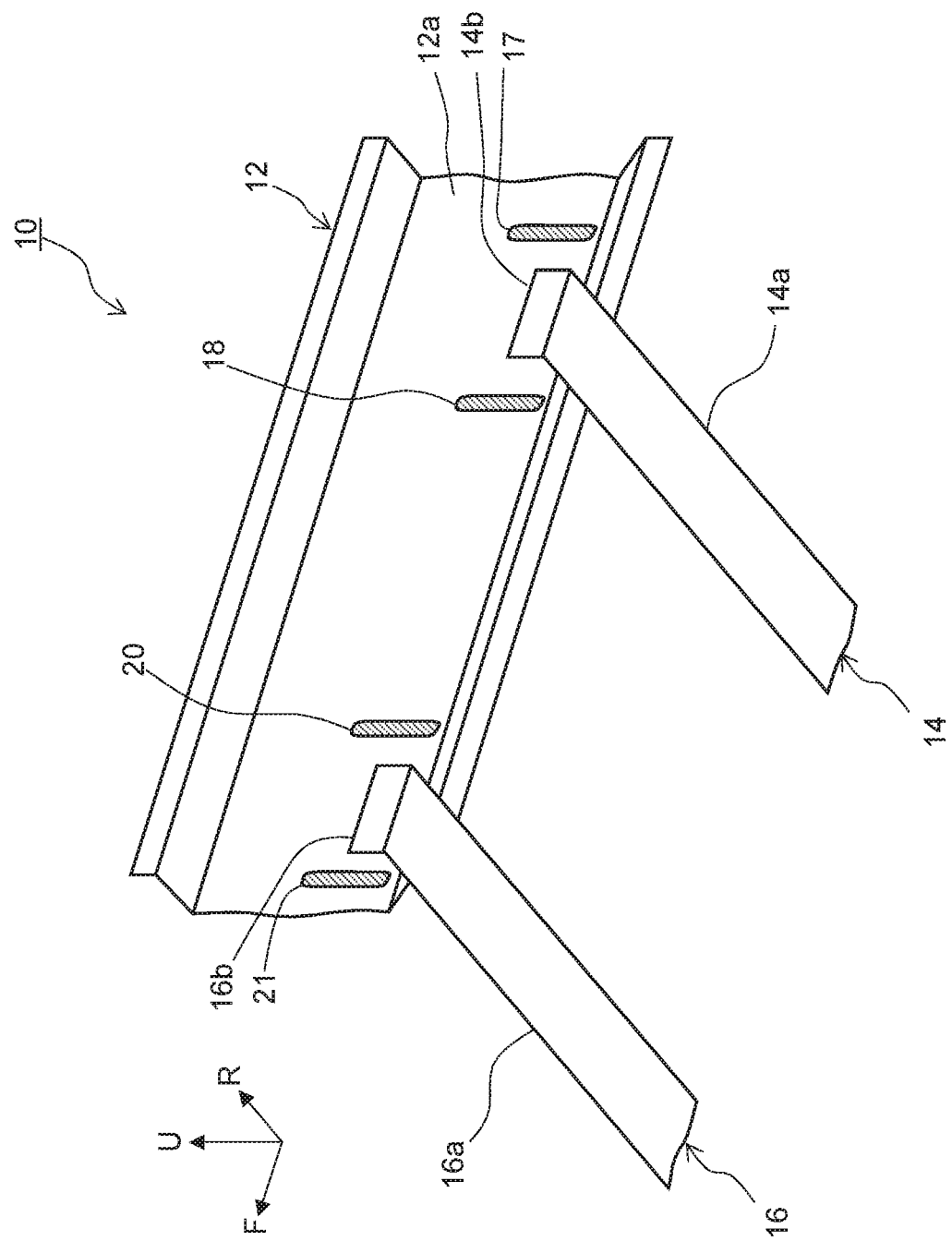
FIG. 1C is a diagram showing a step of applying a connecting seal member to the rocker inner.

FIG. 1C shows the vehicle bottom structure 10 in a step following FIG. 1B. In this step, foamable connecting seal members 17, 18, 20, and 21 are applied to an outer surface (which is a surface facing an outer space, and not the inner space, in the closed cross sectional structure) of the wall portion 12a of the rocker inner 12. The connecting seal member 17 is applied at a position slightly behind the reinforcement member 14, and the connecting seal member 18 is applied at a position slightly in front of the reinforcement member 14. Similarly, the connecting seal member 20 is applied at a position slightly behind the reinforcement member 16, and the connecting seal member 21 is applied at a position slightly in front of the reinforcement member 16. These connecting seal members 17, 18, 20, and 21 extend, in the up-and-down direction, from positions above upper ends of the flanges 14b and 16b of the reinforcement members 14 and 16 to positions below lower ends of the flanges 14b and 16b.

The foamable connecting seal members 17, 18, 20, and 21 are seal members formed by adding a foaming agent to a base material such as synthetic rubber. When the connecting seal members 17, 18, 20, and 21 are heated, air bubbles are formed by the foaming agent inside the base material, so that the volume is increased and elasticity is acquired, and the seal members attach on the periphery and are solidified, to thereby seal the nearby regions.

Figure 1D:
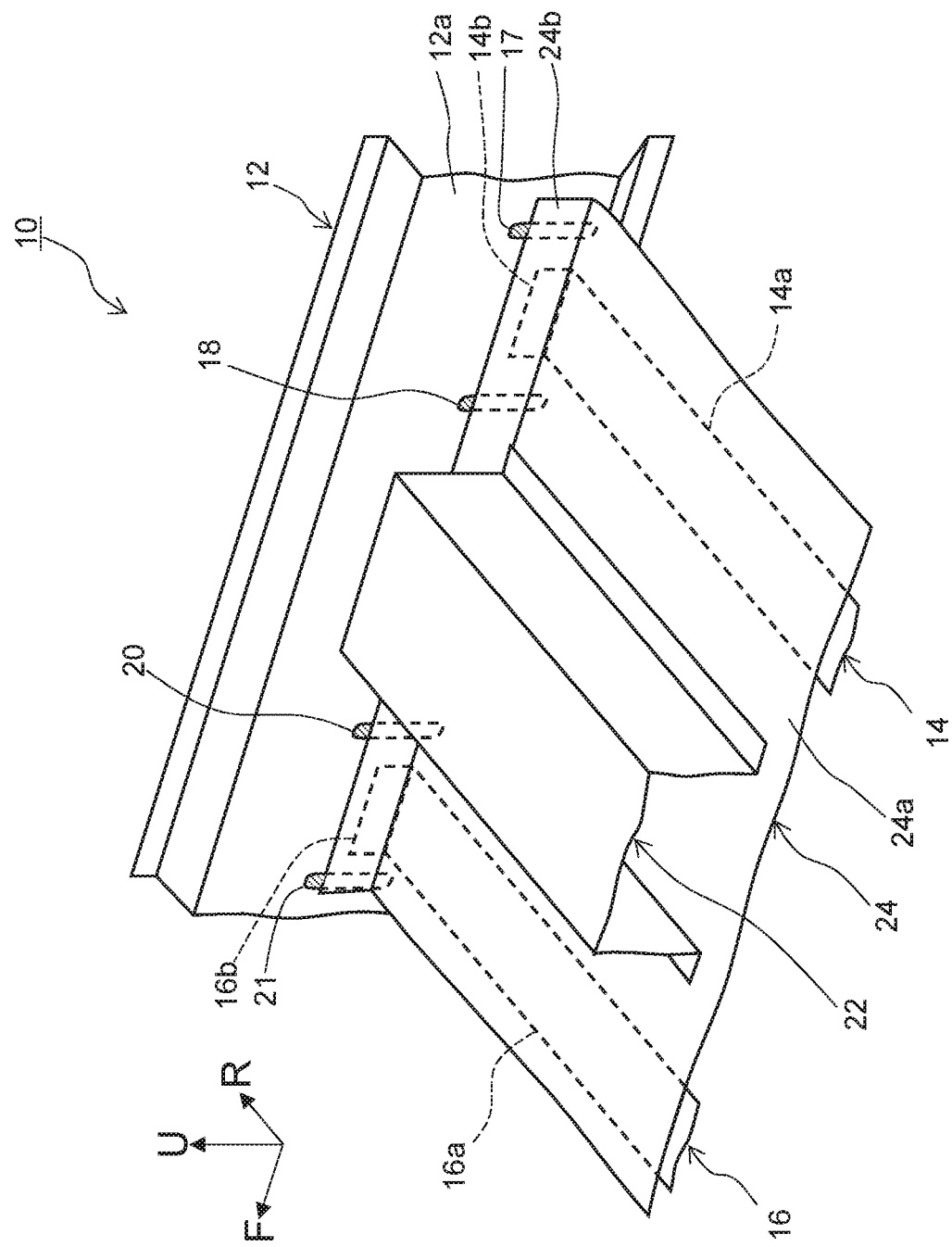
FIG. 1D is a diagram showing a step of connecting a floor panel to the rocker inner.

FIG. 1D shows the vehicle bottom structure 10 in a step following FIG. 1C. In this step, the floor panel 24 to which the cross member 22 is welded and fixed is welded to the rocker inner 12. The cross member 22 is the skeleton member extending in the vehicle width direction, and is formed by bend-machining a steel plate. The cross member 22 is a long member extending from the rocker at the right side of the vehicle to the rocker at the left side of the vehicle, but in FIGS. 1A to 1F, only a region near the rocker inner 12 at the right side is shown. In the cross member 22, the front/rear-up/down cross section (F-U cross section) is formed in an approximate hat shape, and portions corresponding to a brim of the hat are spot welded and fixed onto the floor panel 24.

The floor panel 24 is a plate-shaped member placed on the lower part of the floor of the vehicle cabin (a plate-shaped member is called a panel member), and is also sometimes called a floor pan. The floor panel 24 comprises a body portion 24a which is formed from a steel plate and which forms the lower part of the floor, and a flange 24b provided at a side end of the body portion 24a. In FIG. 1D, only a part of the floor panel 24 is shown. The flange 24b of the floor panel 24 is connected to an outer surface of the wall portion 12a of the rocker inner 12 by spot welding. In the illustrated example configuration, the body portion 24a of the floor panel 24 is placed on the body portions 14a and 16a of the reinforcement members 14 and 16, in such a manner that a lower surface thereof is supported. The flange 24b of the floor panel 24 is placed at a position covering and hiding the flanges 14b and 16b of the reinforcement members 14 and 16. The flange 24b is also placed at intermediate portions, in the up-and-down direction, of the connecting seal members 17, 18, 20, and 21. In the illustrated example configuration, the cross member 22 is not fixed directly on the rocker inner 12.

Figure 1E:
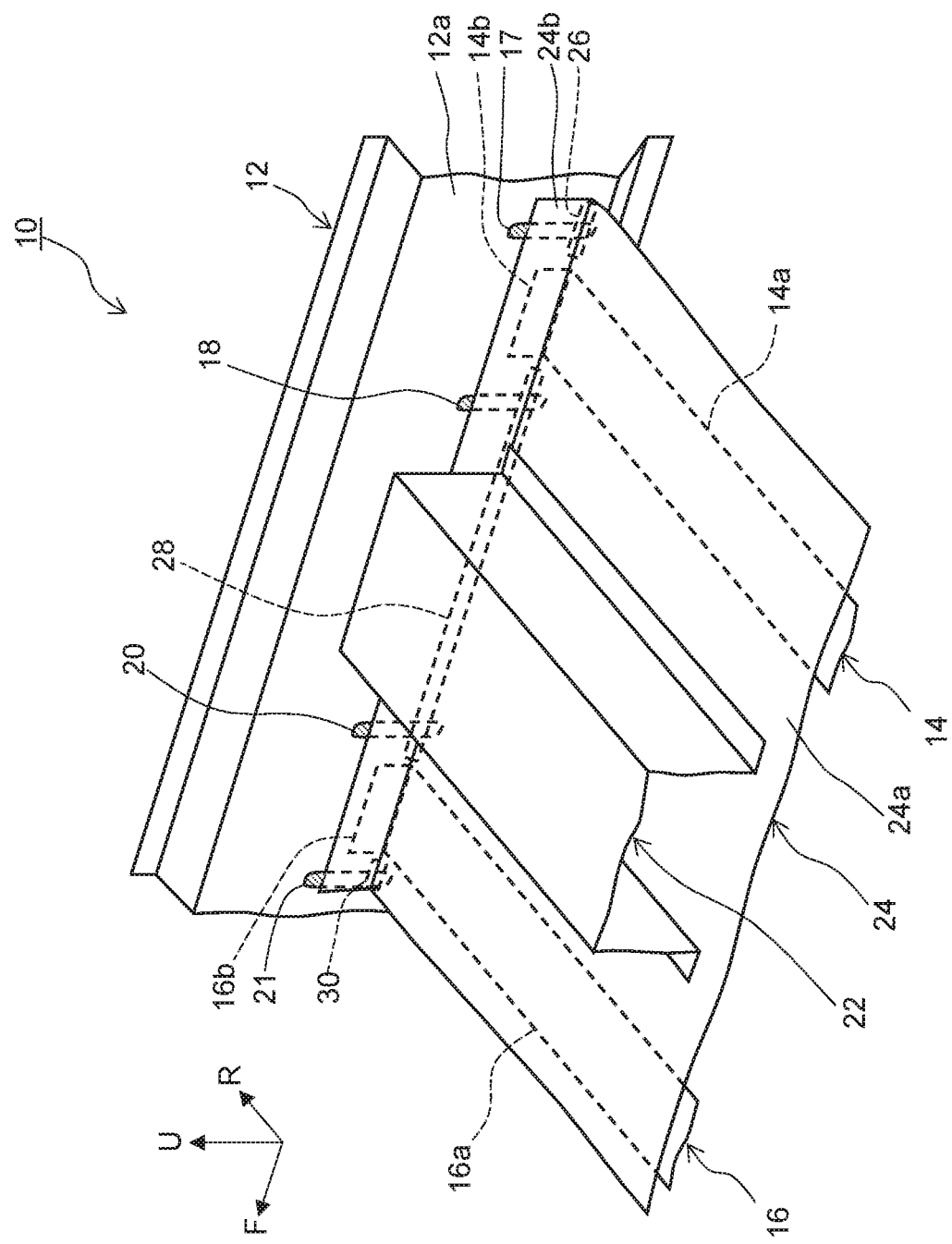
FIG. 1E is a diagram showing a step of applying a lower seal member.

FIG. 1E shows the vehicle bottom structure 10 in a step following FIG. 1D. In this step, the floor panel 24 and the rocker inner 12 are sealed from a lower side of the vehicle. More specifically, the region at the rear in relation to the reinforcement member 14 is a lower sealed part which is sealed by a lower seal member 26. The lower seal member 26 intersects a lower part of the connecting seal member 17, and is in a state of being applied onto a surface of the connecting seal member 17 at the intersecting part. A region between the reinforcement member 14 and the reinforcement member 16 is a lower sealed part which is sealed by a lower seal member 28. The lower seal member 28 intersects lower parts of the connecting seal members 18 and 20, and is in a state of being applied onto surfaces of the connecting seal members 18 and 20 at respective intersecting parts. A region in front in relation to the reinforcement member 16 is a lower sealed part which is sealed by a lower seal member 30. The lower seal member 30 intersects a lower part of the connecting seal member 21, and is in a state of being applied onto a surface of the connecting seal member 21 at the intersecting part.

The lower seal members 26, 28, and 30 are not applied in regions near the flanges 14b and 16b of the reinforcement members 14 and 16. That is, the regions near the flanges 14b and 16b are lower non-sealed parts in which sealing is not performed. This is because, due to the existence of the flanges 14b and 16b, the floor panel 24 and the rocker inner 12 cannot be sealed.

As the lower seal members 26, 28, and 30, for example, an elastic member such as synthetic rubber is used. As the lower seal members 26, 28, and 30, it is also possible to use foamable members, similar to the connecting seal members 17, 18, 20, and 21.

However, the lower seal members 26, 28, and 30 can be applied without foaming, and, if foamed, there is a possibility of interference with members around the seal members.

Thus, normally, a member which does not include the foaming agent is employed as the lower seal members 26, 28, and 30.

Figure 1F:
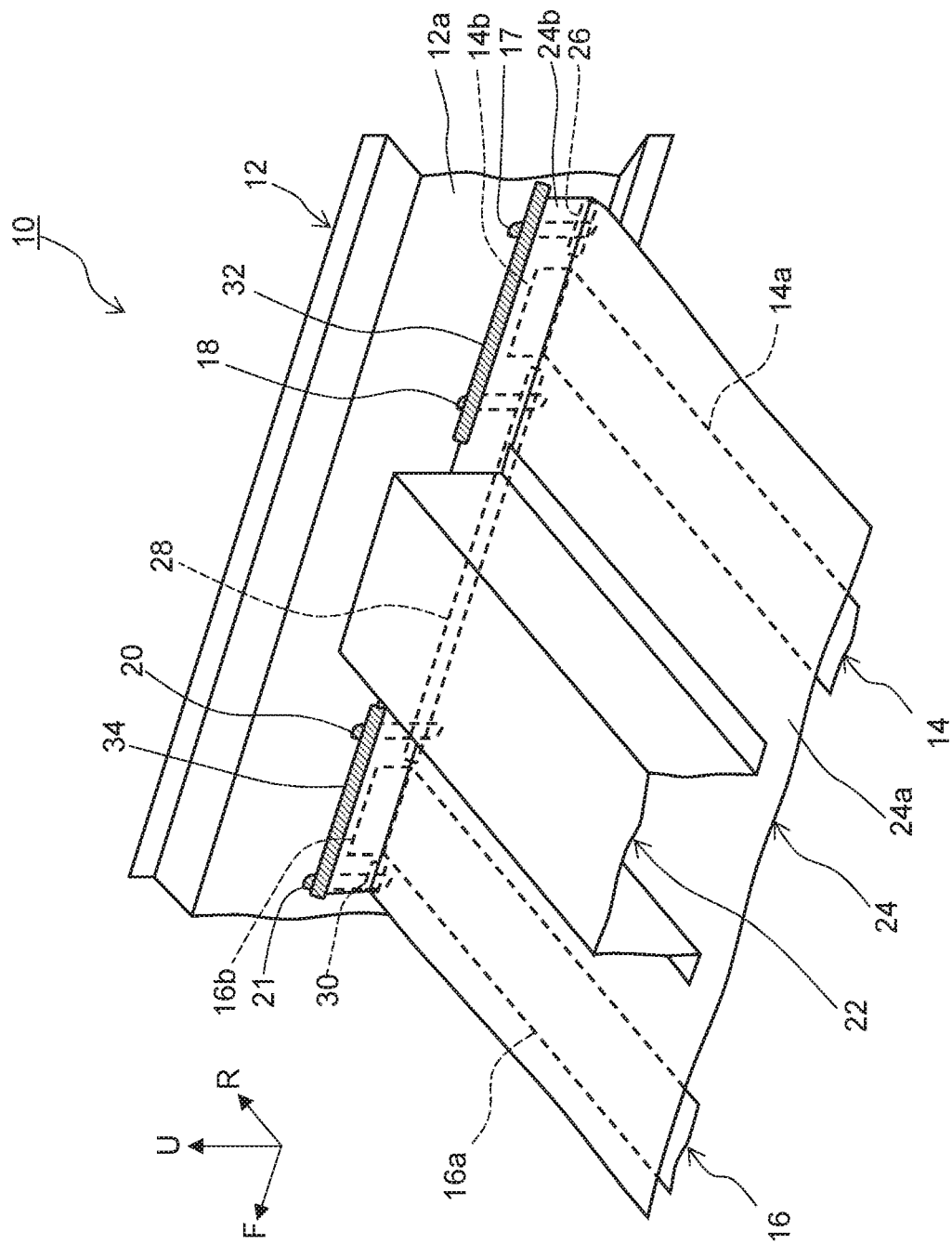
FIG. 1F is a diagram showing a step of applying an upper seal member.

FIG. 1F shows the vehicle bottom structure 10 in a step following FIG. 1E. In this step, the floor panel 24 and the rocker inner 12 are sealed from an upper side of the vehicle. More specifically, a region in the rear in relation to the cross member 22 is an upper sealed part which is sealed by an upper seal member 32. The upper seal member 32 intersects upper parts of the connecting seal members 17 and 18, and is in a state of being applied onto surfaces of the connecting seal members 17 and 18 at the intersecting parts. In addition, a region in front in relation to the cross member 22 is an upper sealed part which is sealed by an upper seal member 34. The upper seal member 34 intersects upper parts of the connecting seal members 20 and 21, and is in a state of being applied onto the connecting seal members 20 and 21 at the intersecting parts. For the upper seal members 32 and 34, materials similar to those for the lower seal members 26, 28, and 30 are employed.

A region near the cross member 22 is an upper non-sealed part in which the sealing is not performed. This is because, due to the existence of the cross member 22, the floor panel 24 and the rocker inner 12 cannot be sealed.

After the sealing by the lower seal members 26, 28, and 30 and the sealing by the upper seal members 32 and 34 are performed, peripheries of the connecting seal members 17, 18, 20, and 21 are heated. With this process, in the connecting seal members 17, 18, 20, and 21, the foaming agent foams, and expansion occurs. The connecting seal members 17, 18, 20, and 21 seal a space of a gap between the flange 24b of the floor panel 24 and the rocker inner 12. In addition, the connecting seal member 17 is connected at the lower part with the lower seal member 26, and at the upper part with the upper seal member 32. Similarly, the connecting seal member 18 is connected at the lower part with the lower seal member 28 and at the upper part with the upper seal member 32. The connecting seal member 20 is connected at the lower part with the lower seal member 28 and at the upper part with the upper seal member 34, and the connecting seal member 21 is connected at the lower part with the lower seal member 30 and at the upper part with the upper seal member 34. With this configuration, as will be described next, seal formation between the floor panel 24 and the rocker inner 12 is completed.

Figure 2:
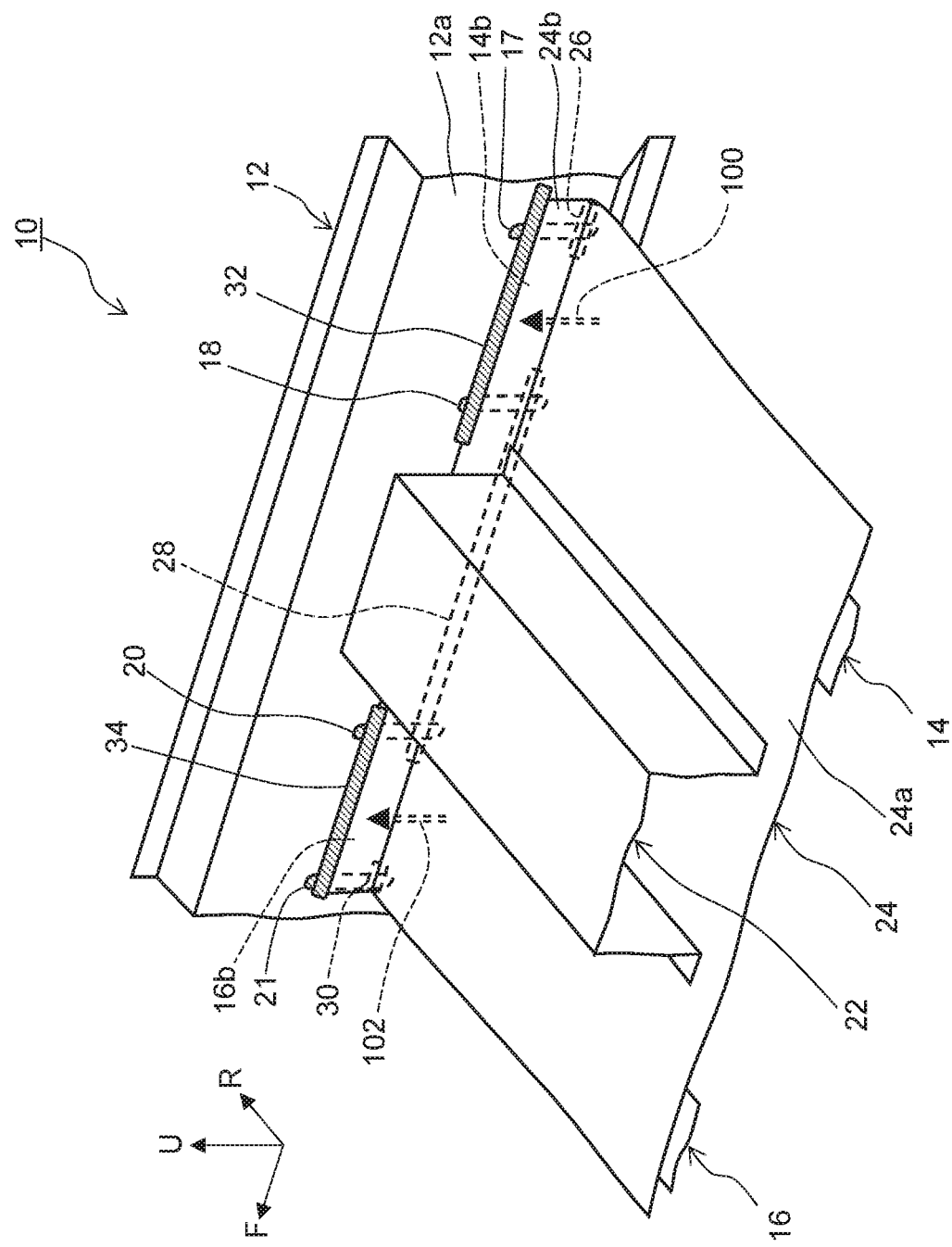
FIG. 2 is a diagram showing a waterproof form in the vehicle bottom structure.

Next, with reference to FIG. 2, a seal function of the vehicle bottom structure 10 will be described. In FIG. 2, for simplifying the drawing, transparent illustration of the reinforcement members 14 and 16 which are shown in FIG. 1F or the like is omitted.

FIG. 2 is a diagram showing a waterproof form of the vehicle bottom structure 10 when the vehicle travels on a road in a flooded state. Here, a state is considered in which a water surface is at a position higher than the floor panel 24. Such a high water surface may be formed in the event of heavy rain, overflow of rivers, or the like. In addition, there are some countries which mandate by law a test for confirming that intrusion of water from the outside of the vehicle cabin into the inside of the vehicle cabin can be reliably prevented during travel on a flooded road having such a high water surface.

In the vehicle bottom structure 10 shown in FIG. 2, the waterproof capability at the body portion 24a of the floor panel 24 is not at all problematic. The body portion 24a of the floor panel 24 is formed in an approximate flat shape from the steel plate, and thus, even if a bolt hole for fastening or the like is formed, the body portion may be easily sealed.

On the other hand, at the gap between an end of the floor panel 24 and the rocker inner 12, the waterproofing is achieved by the seals described above with reference to FIGS. 1A 1F. As shown in FIG. 2, when the vehicle travels on the flooded road, water 100 cannot pass through the lower seal members 26, 28, and 30 at the lower sealed part, but can pass through the lower non-sealed part between the lower seal members 26 and 28. However, because the water 100 cannot pass through the upper seal member 32 which opposes the lower non-sealed part (that is, the upper seal member 32 faces the lower non-sealed part with a slight distance therebetween), the water 100 cannot move upward. In addition, the water 100 cannot move toward the rear of the vehicle due to the connecting seal member 17, nor toward the front of the vehicle due to the connecting seal member 18.

Therefore, the water 100 does not leak into the vehicle cabin.

Similarly, upward movement of water 102 which has passed the lower non-sealed part between the lower seal members 28 and 30 is prevented by the upper seal member 34 which opposes the lower non-sealed part. Further, the water 102 is prevented from moving toward the rear of the vehicle due to the connecting seal member 20, and from moving toward the front of the vehicle due to the connecting seal member 21. Therefore, water 102 also cannot leak into the vehicle cabin.

In the vehicle bottom structure 10 shown in FIG. 2, there is an upper non-sealed part between the upper seal members 32 and 34 due to the existence of the cross member 22. However, near the cross member 22, the waterproof capability is secured by the lower seal member 28 which opposes this upper non-sealed part.

As described, in the connection location between the end of the floor panel 24 and the rocker inner 12, a continuous waterproof line for preventing intrusion of water is formed by the lower seal member 26, the connecting seal member 17, the upper seal member 32, the connecting seal member 18, the lower seal member 28, the connecting seal member 20, the upper seal member 34, the connecting seal member 21, and the lower seal member 30. From another point of view, where the lower non-sealed part (for example, the region near the reinforcement member 14) is present, the waterproof line extends from the lower seal members 26 and 28 at both sides of the lower non-sealed part to the upper seal member 32 which opposes the lower non-sealed part via the connecting seal members 17 and 18. Similarly, where the upper non-sealed part (for example, the region near the cross member 22) is present, the waterproof line extends from the upper seal members 32 and 34 at both sides of the upper non-sealed part to the lower seal member 28 which opposes the upper non-sealed part via the connecting seal members 18 and 20. In other words, where the upper or the lower non-sealed part is present, the connecting seal members are provided at the sealed parts at both sides of the non-sealed part, so that the waterproof line is passed to the opposing, upper or lower sealed part, to thereby prevent intrusion of water into the vehicle cabin.

As a reference, with reference to FIG. 3, a configuration will be described in which the connecting seal members 17, 18, 20, and 21 are not provided. A vehicle bottom structure 200 shown in FIG. 3 is basically similar to the vehicle bottom structure 10 shown in FIG. 2, except that the connecting seal members 17, 18, 20, and 21 are not provided.

Figure 3:
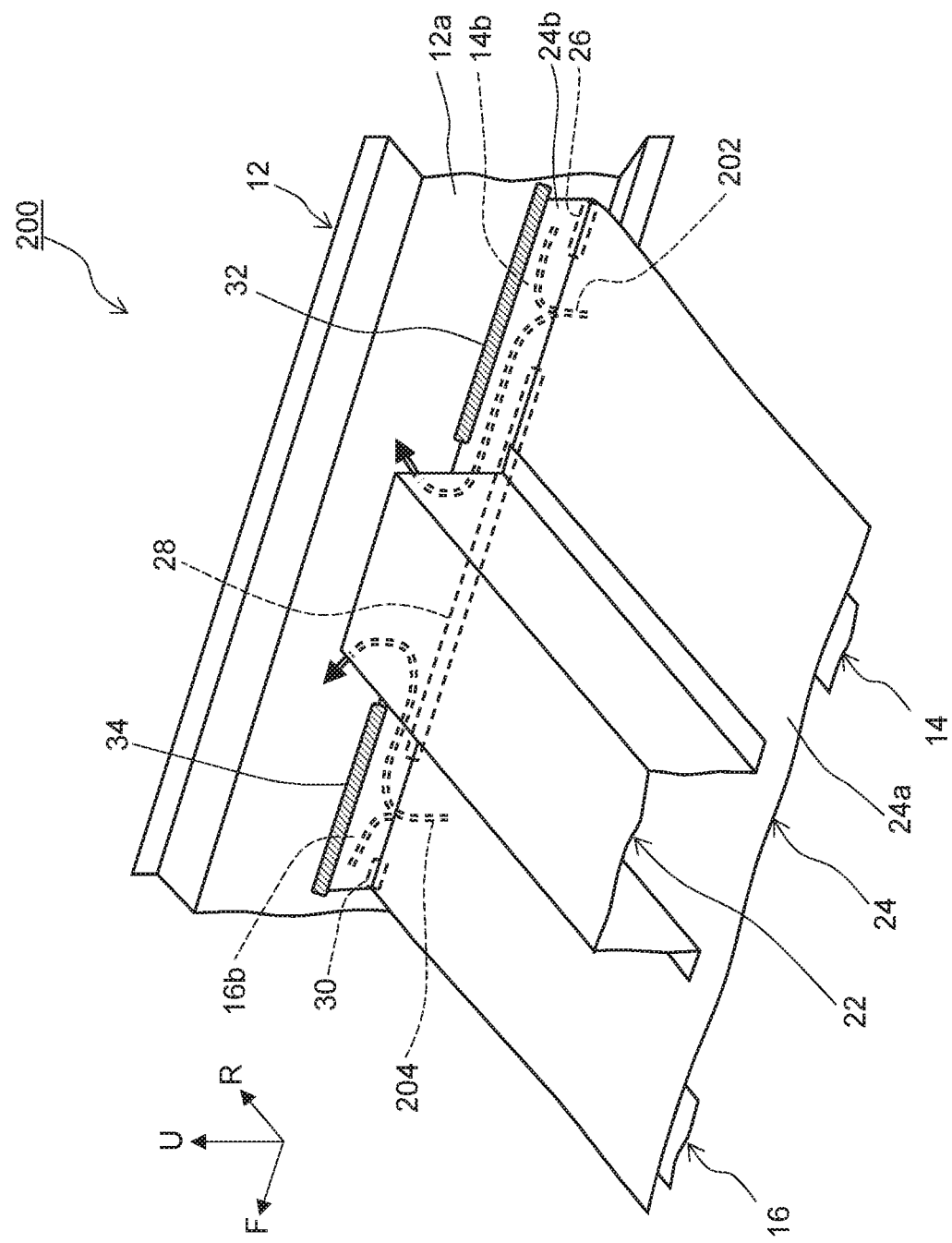
FIG. 3 is a referential diagram showing a vehicle bottom structure which does not have the connecting seal member.

As shown in FIG. 3, in the vehicle bottom structure 200, water 202 and water 204 intruding from the lower non-sealed part cannot pass through the upper seal members 32 and 34, and thus, the water does not immediately leak into the vehicle cabin. However, the water 202 and the water 204 can move in the front-and-rear direction of the vehicle. Therefore, the water 202 and the water 204 enter the vehicle cabin from regions near the cross member 22, which is the upper non-sealed part. From this example configuration, the importance of the connecting seal members 17, 18, 20, and 21 provided in the vehicle bottom structure 10 shown in FIG. 2 can be confirmed.

In the above description, the vehicle bottom structure 10 is described as being formed in the order of the steps shown in FIGS. 1A~1F. However, no particular limitation is imposed on the order of formation of the vehicle bottom structure 10. For example, the application of the upper seal members 32 and 34 as shown in FIG. 1F may be executed prior to the application of the lower seal members 26, 28, and 30 as shown in FIG. 1E.

In addition, in the above description, the non-sealed parts caused by the reinforcement members 14 and 16 and the cross member 22 are described. Alternatively, the non-sealed parts may be provided based on other reasons. For example, a case may be considered in which the sealing cannot be performed because a machine to which the seal member is applied interferes with another member. Alternatively, a case may be considered in which it is necessary to form a bolt hole or the like for attaching a third member on the floor panel 24 or the rocker inner 12, and this bolt hole or the like cannot be completely sealed. When there are two or more consecutive causes of the non-sealed part on the lower or the upper side, the non-sealed parts may be collected as one non-sealed part.

In the above description, a connection part of the floor panel 24 and the rocker inner 12 has been exemplified. Alternatively, the present embodiment can be applied to a connection part of the floor panel 24 and another skeleton member. For example, cases may be exemplified in which the end of the floor panel 24 is connected to the side member, in which the end is connected to a tunnel reinforcement, and in which the end is connected to the cross member.

The invention claimed is:

1. A vehicle bottom structure comprising:
   a skeleton member provided at a bottom of a vehicle;
   a panel member having, at an end thereof, a flange which extends in an up-and-down direction, wherein the flange is connected to the skeleton member;
   a lower seal member that seals a lower side of the flange and the skeleton member from a lower side; and
   an upper seal member that seals an upper side of the flange and the skeleton member from an upper side, wherein
   in regions near a lower non-sealed part in which the sealing by the lower seal member is not performed and near lower sealed parts at both sides of the lower non-sealed part, in which the sealing by the lower seal member is performed, the sealing from the upper side by the upper seal member is performed over a range opposing these regions with the flange therebetween,
   in regions near an upper non-sealed part in which the sealing by the upper seal member is not performed and near upper sealed parts on both sides of the upper non-sealed part, in which the sealing by the upper seal member is performed, the sealing from the lower side by the lower seal member is performed over a range opposing these regions with the flange therebetween, and
   in a region between a location of the lower sealed part on the side of the lower non-sealed part and a location of the upper sealed part on the side of the upper non-sealed part, sealing by a connecting seal member, which connects the lower seal member and the upper seal member and seals the region, is performed.

2. The vehicle bottom structure according to claim 1, wherein
   the connecting seal member is foamable.

3. The vehicle bottom structure according to claim 1, comprising:
   a plurality of the lower non-sealed parts and a plurality of the upper non-sealed parts, wherein
   a waterproof line is passed between the lower seal member and the upper seal member via the connecting seal member, detouring around the plurality of the lower non-sealed parts and the plurality of the upper non-sealed parts.

4. A method of manufacturing the vehicle bottom structure according to claim 1, comprising:
   applying the connecting seal member which is foamable onto the skeleton member or the panel member;
   connecting the skeleton member and the panel member;
   providing the lower seal member and the upper seal member; and
   foaming the connecting seal member.

* * * * *